US012679078B2

(12) United States Patent
Urano et al.

(10) Patent No.: US 12,679,078 B2
(45) Date of Patent: Jul. 14, 2026

(54) LAMINATED FILM AND BAG

(71) Applicant: Sumitomo Chemical Company, Limited, Tokyo (JP)

(72) Inventors: Fumito Urano, Ichihara (JP);
Toshihiko Manami, Ichihara (JP);
Shingo Katayama, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 174 days.

(21) Appl. No.: 18/280,691

(22) PCT Filed: Feb. 21, 2022

(86) PCT No.: PCT/JP2022/007013
§ 371 (c)(1),
(2) Date: Sep. 7, 2023

(87) PCT Pub. No.: WO2022/209423
PCT Pub. Date: Oct. 6, 2022

(65) Prior Publication Data
US 2024/0009981 A1     Jan. 11, 2024

(30) Foreign Application Priority Data

Mar. 30, 2021    (JP) ................................. 2021-057959

(51) Int. Cl.
*B32B 27/18* (2006.01)
*B32B 27/32* (2006.01)

(52) U.S. Cl.
CPC .............. *B32B 27/18* (2013.01); *B32B 27/32* (2013.01); *B32B 2250/03* (2013.01); *B32B 2305/70* (2013.01); *B32B 2307/21* (2013.01); *B32B 2439/46* (2013.01)

(58) Field of Classification Search
CPC ..... B32B 27/18; B32B 27/32; B32B 2250/03; B32B 2305/70; B32B 2307/21; B32B 2439/46; B32B 2250/242; B32B 2250/40; B32B 2272/00; B32B 2307/402; B32B 2307/584; B32B 2307/7376; B32B 2439/06; B32B 27/08; B65D 29/00; B65D 65/40; C08L 101/00; C09J 123/04; C09J 123/10; C09J 123/18
See application file for complete search history.

(56) References Cited

U.S. PATENT DOCUMENTS

| | | | |
|---|---|---|---|
| 2003/0175538 A1 | 9/2003 | Yamaguchi et al. | |
| 2013/0331515 A1* | 12/2013 | Kawamoto | C08K 5/20 |
| | | | 524/706 |
| 2014/0106152 A1 | 4/2014 | Abhyankar et al. | |
| 2021/0016945 A1* | 1/2021 | Ishimaru | B32B 9/005 |

FOREIGN PATENT DOCUMENTS

| | | | | |
|---|---|---|---|---|
| CN | 103608402 A | 2/2014 | | |
| JP | H07329262 A | 12/1995 | | |
| JP | 2001-225426 A | 8/2001 | | |
| JP | 2001-253426 A | 9/2001 | | |
| JP | 2003-73506 A | 3/2003 | | |
| JP | 2003-182744 A | 7/2003 | | |
| JP | 2004160817 A | 6/2004 | | |
| JP | 2005-14592 A | 1/2005 | | |
| JP | 2006022162 A | 1/2006 | | |
| JP | 2010-221665 A | 10/2010 | | |
| JP | 2016-49727 A | 4/2016 | | |
| TR | 2020 22402 A2 * | 2/2021 | ............... | C08J 7/16 |
| WO | WO-2016038110 A2 * | 3/2016 | .............. | C08L 23/10 |

OTHER PUBLICATIONS

TR 2020 22402 A2 machine translation (Year: 2021).*
International Search Report and Written Opinion issued May 10, 2022 in PCT/JP2022/007013.

* cited by examiner

*Primary Examiner* — Blaine Copenheaver

(74) *Attorney, Agent, or Firm* — Panitch Schwarze Belisario & Nadel LLP

(57) ABSTRACT

An object is to provide a laminated film which contains a recycled resin, has a relatively excellent appearance, and has a relatively small damage property, and a bag containing the laminated film. The laminated film contains three or more resin layers including at least one inner layer and two surface layers. The at least one inner layer contains a recycled resin composition containing a recycled resin and an antioxidant, and the content of the antioxidant is 100 ppm by mass to 2000 ppm by mass with respect to the recycled resin composition. The two surface layers contain an unused resin.

14 Claims, No Drawings

LAMINATED FILM AND BAG

CROSS-REFERENCE TO RELATED APPLICATIONS

This application is a Section 371 of International Application No. PCT/JP2022/007013, filed Feb. 21, 2022, which was published in the Japanese language on Oct. 6, 2022 under International Publication No. WO 2022/209423 A1, which claims priority under 35 U.S.C. § 119(b) to Japanese Application No. 2021-057959, filed Mar. 30, 2021.

TECHNICAL FIELD

The present invention relates to a laminated film and a bag containing the laminated film.

BACKGROUND ART

Conventionally, as a plastic recycling method, thermal recycling is mainly used in which heat at the time of burning waste plastic is recovered and reused. However, the Ministry of the Environment formulated "Plastic Resource Circulation Strategy" in May 2019, and stipulated that 100% of used plastics should be effectively utilized by reduction recycling and the like by 2035. Under such a social situation, it is expected that a demand for material recycling in which waste plastic is reused as a raw material of a plastic product will further increase.

In the material recycling, global recycling in which waste plastic used in a film, a sheet, a container, or the like having a large market scale is exported to a foreign country and recycled, or cascade recycling in which quality is lowered and waste plastic is used as a raw material of another product having a small market scale is mainly used. However, in recent years, with import regulations of waste plastic in Asian countries, recycled raw materials (recycled materials) are concentrated in products having a small market scale, and expansion of products to which the recycled raw materials can be applied is urgently needed. In particular, horizontal recycling in which waste plastic is used as a raw material for the same product is the most efficient recycling method, and there is an increasing need for a high-quality recycled raw material applicable to the horizontal recycling.

As a method for reusing waste plastic by the horizontal recycling, for example, Patent Document 1 discloses a method in which a recycled resin obtained from a plastic molded article such as a used container and an unused resin are input at a predetermined ratio, and a plastic molded article having a sandwich structure including a core layer of the recycled resin and a surface layer of the unused resin is molded.

PRIOR ART DOCUMENT

Patent Document

Patent Document 1: JP-A-2004-160817

SUMMARY OF THE INVENTION

Problems to be Solved by the Invention

A product obtained using a recycled raw material in the horizontal recycling desirably has performance equivalent to a product obtained using an unused raw material (virgin material). However, there is a problem that a laminated film containing a recycled resin has a poorer appearance and a larger damage property than a laminated film containing an unused resin.

The present invention has been made in view of such a current situation, and an object of the present invention is to provide a laminated film which contains a recycled resin, has a relatively excellent appearance, and has a relatively small damage property, and a bag containing the laminated film.

Means for Solving the Problems

A laminated film according to the present invention is a laminated film including three or more resin layers including at least one inner layer and two surface layers.

The at least one inner layer contains a recycled resin composition containing a recycled resin and an antioxidant, and the content of the antioxidant is 100 ppm by mass to 2000 ppm by mass with respect to the recycled resin composition. The two surface layers contain an unused resin.

A bag according to the present invention contains the above-described laminated film.

Effect of the Invention

The present invention can provide a laminated film which contains a recycled resin, has a relatively excellent appearance, and has a relatively small damage property, and a bag containing the laminated film.

MODE FOR CARRYING OUT THE INVENTION

Hereinafter, an embodiment of the present invention will be described, but the present invention is not limited to the following embodiment.

1. Laminated Film

A laminated film according to the present embodiment includes three or more resin layers including at least one inner layer and two surface layers, and preferably includes three resin layers.

[Inner Layer]

In the laminated film according to the present embodiment, the at least one inner layer contains a recycled resin composition containing a recycled resin and an antioxidant. The recycled resin composition may further contain an antistatic agent. The recycled resin composition may further contain a neutralizing agent. The recycled resin composition may contain, as other additives, a weathering agent, a lubricant, an anti-blocking agent, an anti-fogging agent, an anti-dripping agent, a pigment, a filler, and the like. The content of the recycled resin is preferably 50% by mass or more, more preferably 70% by mass or more, still more preferably 90% by mass or more, and particularly preferably 95% by mass or more with respect to the recycled resin composition.

Examples of a resin constituting the recycled resin include resins such as a polyolefin-based resin, a (meth)acrylic resin, a polycarbonate-based resin, a polyetherimide-based resin, a polyester-based resin, a polystyrene-based resin, a polyethersulfone-based resin, a fluorine-based resin, an acrylonitrile-butadiene-styrene (ABS)-based resin, an acrylonitrile-styrene (AS)-based resin, and a polyvinyl chloride-based resin. The resin constituting the recycled resin is preferably a polyolefin-based resin. Note that the recycled resin may be a mixture of two or more types of resins.

<Polyolefin-Based Resin>

The polyolefin-based resin is a resin containing an olefin-based polymer. Examples of the polyolefin-based resin include a polyethylene-based resin, a polypropylene-based resin, and a poly α-olefin-based resin.

(Polyethylene-Based Resin)

The polyethylene-based resin is a resin containing an ethylene-based polymer. The ethylene-based polymer is a polymer containing more than 50% by mass of a monomer unit derived from ethylene, that is, an ethylene homopolymer or an ethylene-based copolymer containing more than 50% by mass of a monomer unit derived from ethylene. The ethylene-based polymer is preferably an ethylene homopolymer or an ethylene-based copolymer containing 90% by mass or more of a monomer unit derived from ethylene. Note that the ethylene-based polymer may be used singly or in combination of two or more types thereof.

In the present specification, the "monomer unit" in such a term "monomer unit derived from ethylene" means a polymerization unit of a monomer. Therefore, for example, the "monomer unit derived from ethylene" means a monomer unit of $CH_2CH_2$—.

Examples of the ethylene homopolymer include high pressure method low density polyethylene (LDPE) having a density of 910 kg/m$^3$ to 935 kg/m$^3$, in which ethylene as a repeating unit is randomly bonded to each other with a branched structure by high pressure radical polymerization using a radical initiator.

Examples of the ethylene-based copolymer include a copolymer of ethylene and an α-olefin, and a copolymer of ethylene and an α-olefin having a substituent of an alicyclic compound.

Examples of the copolymer of ethylene and an α-olefin include a linear low density polyethylene having crystallinity, and an elastomer of a copolymer of ethylene and an α-olefin, having low crystallinity and rubber-like elastic characteristics.

The density of the linear low density polyethylene is preferably 900 kg/m$^3$ to 940 kg/m$^3$. The density of the elastomer of the copolymer of ethylene and an α-olefin is preferably 860 kg/m$^3$ to 900 kg/m$^3$.

The α-olefin is preferably an α-olefin having 3 to 12 carbon atoms. Examples of the α-olefin having 3 to 10 carbon atoms include propylene, 1-butene, 1-pentene, 1-hexene, 4-methyl-1-pentene, 1-octene, 1-decene, and 3-methyl-1-butene. The α-olefin having 3 to 10 carbon atoms is preferably an α-olefin having 4 to 10 carbon atoms, and more preferably 1-butene, 1-hexene, or 1-octene.

Examples of the α-olefin having a substituent of an alicyclic compound include vinylcyclohexane.

The content of a monomer unit derived from an α-olefin in the ethylene-based copolymer is preferably 4% by mass to 20% by mass.

Specific examples of the copolymer of ethylene and an α-olefin include an ethylene-1-butene copolymer, an ethylene-1-hexene copolymer, an ethylene-1-octene copolymer, an ethylene-1-decene copolymer, and an ethylene-(3-methyl-1-butene) copolymer. Note that the copolymer of ethylene and α-olefin may be used singly or in combination of two or more types thereof. In addition, the ethylene-based polymer may be a mixture of an ethylene homopolymer and a copolymer of ethylene and an α-olefin.

A melt flow rate (MFR) of the ethylene-based polymer measured at a temperature of 190° C. under a load of 2.16 kg is preferably 0.5 g/10 min to 50 g/10 min, more preferably 1 g/10 min to 30 g/10 min, and still more preferably 1 g/10 min to 20 g/10 min. Note that the MFR is measured according to Method A defined in JIS K7210-1.

(Polypropylene-Based Resin)

The polypropylene-based resin is a resin containing a propylene-based polymer. The propylene-based polymer is a polymer containing more than 50% by mass of a monomer unit derived from propylene, that is, a propylene homopolymer or a propylene-based copolymer containing more than 50% by mass of a monomer unit derived from propylene. The propylene-based copolymer is preferably a copolymer of propylene and ethylene and/or an α-olefin having 4 to 12 carbon atoms.

A melt flow rate (MFR) of the propylene homopolymer measured at a temperature of 230° C. under a load of 2.16 kg is preferably 0.1 g/10 min to 50 g/10 min. A melt flow rate (MFR) of the copolymer of propylene and ethylene and/or an α-olefin having 4 to 12 carbon atoms measured at a temperature of 230° C. under a load of 2.16 kg is preferably 10 g/10 min to 200 g/10 min. Note that the MFR is measured according to Method A defined in JIS K7210-1.

When the total mass of the copolymer of propylene and ethylene and/or an α-olefin having 4 to 12 carbon atoms is 100% by mass, the content of a monomer unit derived from ethylene and/or an α-olefin having 4 to 12 carbon atoms is preferably 0.1% by mass to 40% by mass, and the content of a monomer unit derived from propylene is preferably 60% by mass to 99.9% by mass.

Examples of the α-olefin having 4 to 12 carbon atoms include 1-butene, 1-pentene, 1-hexene, 4-methyl-1-pentene, 1-octene, and 1-decene.

The α-olefin having 4 to 12 carbon atoms is preferably 1-butene, 1-hexene, or 1-octene.

Specific examples of the copolymer of propylene and ethylene and/or an α-olefin having 4 to 12 carbon atoms include a copolymer of propylene and ethylene, a copolymer of propylene and an α-olefin having 4 to 12 carbon atoms, and a copolymer of propylene, ethylene, and an α-olefin having 4 to 12 carbon atoms. Note that the copolymer of propylene and ethylene and/or an α-olefin having 4 to 12 carbon atoms may be used singly or in combination of two or more types thereof. In addition, the propylene-based polymer may be a mixture of a propylene homopolymer and a copolymer of propylene and ethylene and/or an α-olefin having 4 to 12 carbon atoms.

Examples of the copolymer of propylene and an α-olefin having 4 to 12 carbon atoms include a propylene-1-butene copolymer, a propylene-1-hexene copolymer, a propylene-1-octene copolymer, and a propylene-1-decene copolymer.

Examples of the copolymer of propylene, ethylene, and an α-olefin having 4 to 12 carbon atoms include a propylene-ethylene-1-butene copolymer, a propylene-ethylene-1-hexene copolymer, a propylene-ethylene-1-octene copolymer, and a propylene-ethylene-1-decene copolymer.

(Poly α-Olefin-Based Resin)

The poly α-olefin-based resin is a resin containing an α-olefin-based polymer. The α-olefin-based polymer is a polymer containing more than 50% by mass of a monomer unit derived from an α-olefin, that is, an α-olefin homopolymer or an α-olefin-based copolymer containing more than 50% by mass of a monomer unit derived from an α-olefin. Examples of the α-olefin-based copolymer include a copolymer of an α-olefin and ethylene and a copolymer of an α-olefin and propylene.

The α-olefin is preferably an α-olefin having 4 to 12 carbon atoms. Examples of the α-olefin having 4 to 12 carbon atoms include 1-butene, 1-pentene, 1-hexene, 1-heptene, 1-octene, 1-nonene, 1-decene, 4-methyl-1-pentene, and 4-methyl-1-hexene. The α-olefin having 4 to 12 carbon atoms is preferably 1-butene, 1-hexene, or 1-octene.

The density of the α-olefin-based polymer is preferably 850 kg/m³ to 950 kg/m³, more preferably 850 kg/m³ to 930 kg/m³, and still more preferably 880 kg/m³ to 930 kg/m³.

A melt flow rate (MFR) of the α-olefin-based polymer measured at a temperature of 190° C. under a load of 2.16 kg is preferably 0.1 g/10 min to 50 g/10 min, more preferably 0.1 g/10 min to 10 g/10 min, and still more preferably 1 g/10 min to 5 g/10 min. Note that the MFR is measured according to Method A defined in JIS K7210-1.

<Acrylic Resin>

The acrylic resin is a resin containing an acrylic polymer. Examples of the acrylic polymer include polymers of acrylic acid and an acrylic acid derivative such as an ester of the acrylic acid, polymers of methacrylic acid and a methacrylic acid derivative such as an ester of the methacrylic acid, and a copolymer of an acrylic acid derivative and a methacrylic acid derivative.

Examples of the acrylic polymer include: a methacrylic homopolymer containing only a monomer unit derived from an alkyl methacrylate having an alkyl group having 1 to 4 carbon atoms; and a methacrylic copolymer containing 50% by mass or more and less than 100% by mass of a monomer unit derived from an alkyl methacrylate having an alkyl group having 1 to 4 carbon atoms and more than 0% by mass and 50% by mass or less of a monomer unit derived from another vinyl monomer copolymerizable with the monomer unit derived from an alkyl methacrylate having an alkyl group having 1 to 4 carbon atoms.

The "alkyl methacrylate having an alkyl group having 1 to 4 carbon atoms" is a compound represented by $CH_2=CH(CH_3)COOR$ (R represents an alkyl group having 1 to 4 carbon atoms). The "vinyl monomer copolymerizable with an alkyl methacrylate having an alkyl group having 1 to 4 carbon atoms" is a monomer copolymerizable with an alkyl methacrylate having an alkyl group having 1 to 4 carbon atoms and having a vinyl group.

Examples of the alkyl methacrylate having an alkyl group having 1 to 4 carbon atoms include methyl methacrylate, ethyl methacrylate, n-propyl methacrylate, isopropyl methacrylate, n-butyl methacrylate, tert-butyl methacrylate, sec-butyl methacrylate, and isobutyl methacrylate. The alkyl methacrylate having an alkyl group having 1 to 4 carbon atoms is preferably methyl methacrylate. The alkyl methacrylate may be used singly or in combination of two or more types thereof.

Examples of the vinyl monomer copolymerizable with an alkyl methacrylate having an alkyl group having 1 to 4 carbon atoms include: a methacrylate such as cyclohexyl methacrylate, benzyl methacrylate, 2-ethylhexyl methacrylate, 2-hydroxyethyl methacrylate, hydroxypropyl methacrylate, or monoglycerol methacrylate (provided that an alkyl methacrylate having an alkyl group having 1 to 4 carbon atoms is excluded); an acrylate such as methyl acrylate, ethyl acrylate, propyl acrylate, butyl acrylate, 2-ethylhexyl acrylate, 2-hydroxyethyl acrylate, 2-hydroxypropyl acrylate, or monoglycerol acrylate; an unsaturated carboxylic acid or an acid anhydride thereof, such as acrylic acid, methacrylic acid, maleic acid, itaconic acid, maleic anhydride, or itaconic anhydride; a nitrogen-containing monomer such as acrylamide, methacrylamide, acrylonitrile, methacrylonitrile, diacetone acrylamide, or dimethylaminoethyl methacrylate; an epoxy group-containing monomer such as allyl glycidyl ether, glycidyl acrylate, or glycidyl methacrylate; and a styrene-based monomer such as styrene or α-methylstyrene.

<Polycarbonate-Based Resin>

The polycarbonate-based resin is a resin containing a polymer containing a monomer unit derived from a dihydroxy compound. Examples of such a polymer include: a polymer obtained by causing a dihydroxy compound such as a dihydric phenol or isosorbide to react with a carbonylating agent by an interfacial polycondensation method, a melt transesterification method, or the like; a polymer obtained by polymerizing a carbonate prepolymer by a solid phase transesterification method or the like; and a polymer obtained by polymerizing a cyclic carbonate compound by a ring-opening polymerization method.

Examples of the dihydric phenol include hydroquinone, resorcinol, 4,4'-dihydroxydiphenyl, bis(4-hydroxyphenyl) methane, bis{(4-hydroxy-3,5-dimethyl) phenyl} methane, 1,1-bis(4-hydroxyphenyl) ethane, 1,1-bis(4-hydroxyphenyl)-1-phenylethane, 2,2-bis(4-hydroxyphenyl) propane (commonly called bisphenol A), 2,2-bis{(4-hydroxy-3-methyl) phenyl} propane, 2,2-bis{(4-hydroxy-3,5-dimethyl) phenyl} propane, 2,2-bis{(4-hydroxy-3,5-dibromo) phenyl} propane, 2,2-bis{(3-isopropyl-4-hydroxy) phenyl} propane, 2,2-bis{(4-hydroxy-3-phenyl) phenyl} propane, 2,2-bis(4-hydroxyphenyl) butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl) pentane, 2,2-bis(4-hydroxyphenyl)-4-methylpentane, 1,1-bis(4-hydroxyphenyl) cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl) fluorene, 9,9-bis{(4-hydroxy-3-methyl) phenyl} fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenylsulfoxide, 4,4'-dihydroxydiphenylsulfide, 4,4'-dihydroxydiphenylketone, 4,4'-dihydroxydiphenyl ether, and 4,4'-dihydroxydiphenyl ester.

Note that the dihydric phenol may be used singly or in combination of two or more types thereof.

The dihydric phenol is preferably bisphenol A, 2,2-bis{(4-hydroxy-3-methyl) phenyl} propane, 2,2-bis(4-hydroxyphenyl) butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, or α,α'-bis(4-hydroxyphenyl)-m-diisopropylbenzene. In particular, as the dihydric phenol, it is preferable to use bisphenol A alone or to use bisphenol A in combination with at least one selected from the group consisting of 1,1-bis(4-hydroxyphenyl)-3,3,5-trimethylcyclohexane, 2,2-bis{(4-hydroxy-3-methyl) phenyl} propane, and α,α'-bis(4-hydroxyphenyl)-m-diisopropylbenzene.

Examples of the carbonylating agent include a carbonyl halide (phosgene and the like), a carbonate ester (diphenyl carbonate and the like), and a haloformate (a dihaloformate of a dihydric phenol and the like). The carbonylating agent may be used singly or in combination of two or more types thereof.

The recycled resin composition can be obtained by a known method described in, for example, JP-A-2010-234812, JP-A-2009-214398, JP-A-2008-55845, JP-A-2007-22061, or JP-A-2007-15340.

The recycled resin composition is preferably used in a granulated pellet shape. A pellet of the recycled resin composition is obtained, for example, by washing a recovered film using a solvent such as alcohol, drying the film, crushing and melting the film, adding an antioxidant and, as necessary, another additive thereto, and then pelletizing the mixture. Note that the recycled resin composition may be obtained by mixing the pellet thus obtained with a master-batch containing an additive.

In the laminated film according to the present embodiment, the recycled resin preferably contains a resin containing a polymer containing a monomer unit derived from at least one selected from the group consisting of ethylene, propylene, and α-olefin having 4 to 12 carbon atoms. The content of the resin containing the polymer is preferably 99.5% by mass or more with respect to the recycled resin. The resin constituting the recycled resin is more preferably a resin containing an ethylene homopolymer or an ethylene-based copolymer containing more than 50% by mass of a monomer unit derived from ethylene. The ethylene-based copolymer preferably contains 90% by mass or more of a monomer unit derived from ethylene.

Examples of the antioxidant include a phenol-based antioxidant and a phosphorus-based antioxidant. The antioxidant is preferably a phosphorus-based antioxidant. Note that the antioxidant may be used singly or in combination of two or more types thereof.

Examples of the phenol-based antioxidant include 2,6-di-t-butyl-4-methylphenol (BHT), n-octadecyl-3-(3,5-di-t-butyl-4-hydroxyphenyl) propionate (trade name: Irganox 1076, manufactured by Ciba Specialty Chemicals Co., Ltd.), pentaerythrityl-tetrakis[3-(3,5-di-t-butyl-4-hydroxyphenyl) propionate] (trade name: Irganox 1010, manufactured by Ciba Specialty Chemicals Co., Ltd.), 1,3,5-tris(3,5-di-tert-butyl-4-hydroxybenzyl) isocyanurate (trade name: Irganox 3114, manufactured by Ciba Specialty Chemicals Co., Ltd.), 1,3,5-trimethyl-2,4,6-tris(3,5-di-t-butyl-4-hydroxybenzyl) benzene, and 3,9-bis[2-{3-(3-t-butyl-4-hydroxy-5-methylphenyl) propionyloxy}-1,1-dimethylethyl]-2,4,8,10-tetraoxaspiro [5·5] undecane (trade name: Sumilizer GA 80, manufactured by Sumitomo Chemical Co., Ltd.).

Examples of the phosphorus-based antioxidant include distearyl pentaerythritol diphosphite (trade name: ADK STAB PEP8), tris(2,4-di-t-butylphenyl) phosphite (trade name: Irgafos 168, manufactured by Ciba Specialty Chemicals Co., Ltd.), bis(2,4-di-t-butylphenyl) pentaerythritol diphosphite, tetrakis(2,4-di-t-butylphenyl) 4,4'-biphenylene diphosphonite (trade name: Sandostab P-EPQ, manufactured by Clariant Shapan Co., Ltd.), bis(2-t-butyl-4-methylphenyl) pentaerythritol diphosphite, and 2,4,8,10-tetra-t-butyl-6-[3-(3-methyl-4-hydroxy-5-t-butylphenyl) propoxy] dibenzo[d,f] [1,3,2] dioxaphosphepin (trade name: Sumilizer GP, manufactured by Sumitomo Chemical Co., Ltd.).

The content of the antioxidant is 100 ppm by mass to 2000 ppm by mass, preferably 200 ppm by mass to 1500 ppm by mass, and more preferably 500 ppm by mass to 1000 ppm by mass with respect to the recycled resin composition from a viewpoint of improving an appearance and reducing a damage property.

Examples of the antistatic agent include a glycerin ester and a sorbitanoic acid ester of a fatty acid having 8 to 22 carbon atoms, an alkyl dialkanolamide of a fatty acid having 8 to 22 carbon atoms, a polyethylene glycol ester, and an alkyl diethanolamine. The antistatic agent is preferably diethanolamide. Note that the antistatic agent may be used singly or in combination of two or more types thereof.

The content of the antistatic agent is preferably 100 ppm by mass to 2000 ppm by mass, more preferably 200 ppm by mass to 1000 ppm by mass, and still more preferably 300 ppm by mass to 500 ppm by mass with respect to the recycled resin composition from a viewpoint of reducing a damage property. In addition, the content of the antistatic agent is preferably 100 ppm by mass to 8000 ppm by mass with respect to the recycled resin composition from a viewpoint of improving a hue.

Examples of the neutralizing agent include calcium stearate, hydrotalcite, an oxide of an alkaline earth metal, and a hydroxide of an alkaline earth metal. The neutralizing agent is preferably calcium stearate. Note that the neutralizing agent may be used singly or in combination of two or more types thereof.

The content of the neutralizing agent is preferably 100 ppm by mass to 2000 ppm by mass, and more preferably 100 ppm by mass to 500 ppm by mass with respect to the recycled resin composition from a viewpoint of improving an appearance.

In the laminated film according to the present embodiment, the at least one inner layer may contain an unused resin described later. The content of the unused resin is preferably 50% by mass or less, and more preferably 25% by mass or less with respect to one inner layer.

[Surface Layer]

In the laminated film according to the present embodiment, the two surface layers contain an unused resin. The surface layer may contain, as an additive, an antioxidant, an antistatic agent, a neutralizing agent, a weathering agent, a lubricant, an anti-blocking agent, an anti-fogging agent, an anti-dripping agent, a pigment, a filler, or the like.

Examples of a resin constituting the unused resin include a resin similar to the resin constituting the recycled resin. The resin constituting the unused resin is preferably a resin containing a polymer containing a monomer unit derived from at least one selected from the group consisting of ethylene, propylene, and an α-olefin having 4 to 12 carbon atoms, and more preferably a resin containing an ethylene homopolymer or an ethylene-based copolymer containing 50% by mass or more of a monomer unit derived from ethylene.

The ethylene-based copolymer preferably contains 90% by mass or more of a monomer unit derived from ethylene.

When the resin constituting the unused resin is a polyethylene-based resin, an ethylene-based polymer contained in the resin can be manufactured by a known polymerization method using a known polymerization catalyst.

Examples of the polymerization catalyst include a homogeneous catalyst system represented by a metallocene catalyst, a Ziegler type catalyst system, and a Ziegler-Natta type catalyst system. Examples of the homogeneous catalyst system include: a catalyst system containing a transition metal compound of group 4 of the periodic table having a cyclopentadienyl ring and an alkylaluminoxane; a catalyst system containing a transition metal compound of group 4 of the periodic table having a cyclopentadienyl ring, a compound that reacts with the transition metal compound to form an ionic complex, and an organic aluminum compound; a catalyst system in which a catalyst component such as a transition metal compound of group 4 of the periodic table having a cyclopentadienyl ring, a compound that forms an ionic complex, or an organic aluminum compound is supported on inorganic particles such as silica and clay minerals, and modified; and a prepolymerization catalyst system prepared by prepolymerizing ethylene or an α-olefin in the presence of the above catalyst systems.

High pressure method low density polyethylene (LDPE) can be manufactured using a radical initiator as a polymerization catalyst.

When the resin constituting the unused resin is a polypropylene-based resin, a propylene-based polymer contained in the resin can be manufactured by a known polymerization method using a known olefin polymerization catalyst.

Examples of the polymerization catalyst include: a Ziegler type catalyst system; a Ziegler-Natta type catalyst system; a catalyst system containing a transition metal compound of group 4 of the periodic table having a cyclopentadienyl ring and an alkylaluminoxane; a catalyst system containing a transition metal compound of group 4 of the periodic table having a cyclopentadienyl ring, a compound that reacts with the transition metal compound to form an ionic complex, and an organic aluminum compound; and a catalyst system in which a catalyst component such as a transition metal compound of group 4 of the periodic table having a cyclopentadienyl ring, a compound that forms an ionic complex, or an organic aluminum compound is supported on inorganic particles such as silica and clay minerals, and modified, and a prepolymerization catalyst system prepared by prepolymerizing ethylene or an α-olefin in the presence of the above catalyst systems may be used.

The propylene-based polymer may be manufactured by a method in which a plurality of polymerization steps is performed in multiple stages (multistage polymerization method) from a viewpoint of improving productivity. A multistage polymer obtained by such a multistage polymerization method may contain at least two propylene-based polymers, or may contain one propylene-based polymer.

When the resin constituting the unused resin is a poly α-olefin-based resin, an α-olefin-based polymer contained in the resin can be manufactured, for example, using a metallocene catalyst. The metallocene catalyst is, for example, an olefin polymerization catalyst using a transition metal compound having a group having a cyclopentadiene type anion skeleton (hereinafter, also referred to as "metallocene-based transition metal compound").

The metallocene-based transition metal compound is, for example, a compound represented by formula $MLaXn-a$ (in which M represents a transition metal atom of group 4 of the periodic table of elements or the lanthanide series. L represents a group having a cyclopentadiene type anion skeleton or a group containing a hetero atom, and at least one of Ls is a group having a cyclopentadiene type anion skeleton. The plurality of Ls may be crosslinked with each other. X represents a halogen atom, a hydrogen atom, or a hydrocarbon group having 1 to 20 carbon atoms. n represents a valence of the transition metal atom, and a represents an integer satisfying $0 < a \leq n$).

Examples of the metallocene-based transition metal compound represented by the above formula include bis(1,3-n-butylmethylcyclopentadienyl) zirconium dichloride, bis(1, 3-n-propylmethylcyclopentadienyl) zirconium dichloride, bis(n-butylcyclopentadienyl) zirconium dichloride, bis(1,3-dimethylcyclopentadienyl) zirconium dichloride, bis(1,3-diethylcyclopentadienyl) zirconium dichloride, ethylene bis (indenyl) zirconium dichloride, ethylene bis(4-methyl-1-indenyl) zirconium dichloride, and ethylene bis(4,5,6,7-tetrahydro-1-indenyl) zirconium dichloride.

The metallocene-based transition metal compound is preferably used in contact with an activation co-catalyst. Examples of the activation co-catalyst include an activation co-catalyst obtained by using an alumoxane compound or an organoaluminum compound in combination with a boron compound such as tritylborate or anilinium borate. In addition, combined use with a particulate carrier containing an inorganic carrier such as $SiO_2$ or $Al_2O_3$ or an organic carrier such as a polymer of ethylene, styrene, or the like may be performed.

When the resin constituting the unused resin is an acrylic resin, an acrylic polymer contained in the resin can be obtained by polymerizing an alkyl methacrylate having an alkyl group having 1 to 4 carbon atoms with, as necessary, a vinyl monomer copolymerizable with the alkyl methacrylate having an alkyl group having 1 to 4 carbon atoms by a method such as bulk polymerization, solution polymerization, suspension polymerization, or emulsion polymerization.

When the resin constituting the unused resin is a polycarbonate-based resin, a polymer containing a monomer unit derived from a dihydroxy compound contained in the resin can be manufactured by a method for causing a dihydroxy compound such as a dihydric phenol or isosorbide to react with a carbonylating agent by an interfacial polycondensation method, a melt transesterification method, or the like, a method for polymerizing a carbonate prepolymer by a solid phase transesterification method or the like, or polymerizing a cyclic carbonate compound by a ring-opening polymerization method or the like.

In the laminated film according to the present embodiment, the two surface layers may contain the above-described recycled resin. The content of the recycled resin is preferably 50% by mass or less, and more preferably 25% by mass or less with respect to one surface layer.

The thickness of the laminated film according to the present embodiment is preferably 10 μm to 300 μm, and more preferably 100 μm to 150 μm. In the laminated film according to the present embodiment, the thickness of one inner layer is preferably 30 μm to 50 μm, and the thickness of one surface layer is preferably 30 μm to 50 μm.

The laminated film according to the present embodiment can be manufactured using a known method. Examples of the known method include an inflation method and a T-die method, and the inflation method is preferable.

Examples of a method for laminating the layers include: a method using a feed block type die in which a molten resin of a recycled resin or an unused resin flowing into the die from a plurality of extruders is combined in layers in the die; and a method using a multi-manifold type die in which a molten resin of a recycled resin or an unused resin flowing into the die from a plurality of extruders is fed into separate manifolds and combined in layers immediately before a lip portion of the die.

The laminated film can be suitably used as, for example, a packaging bag for storing foods, fibers, miscellaneous goods, and the like, and a packaging container.

2. Bag

A bag according to the present embodiment contains the above-described laminated film.

The bag is manufactured by a known molding method, for example, a method for heat-sealing a tubular film molded by an inflation molding method in a direction (TD direction) orthogonal to a take-up direction (MD direction), a method for stacking two films molded by a T-die cast film molding method and sealing four sides, or the like.

Note that the laminated film and the bag according to the present embodiment are not limited to the above embodiment, and various modifications can be made without departing from the gist of the present invention. In addition, the configurations, methods, and the like of embodiments other than the above may be arbitrarily adopted and combined, and the configuration, method, and the like according to the above one embodiment may be applied to the configurations, methods, and the like according to embodiments other than the above.

EXAMPLES

Hereinafter, the present invention will be described more specifically with reference to Examples and Comparative Examples, but the present invention is not limited to the following Examples.

In Examples and Comparative Examples, the following were used.

[Unused Resin Pellet]

An unused resin pellet was prepared by pellet-blending the following (1) to (3) at a mass ratio of 68/29/3.

(1) A pellet containing linear low density polyethylene (MFR=1.5 g/10 min, density=923 kg/m$^3$) and an antioxidant (Sumilizer GP, manufactured by Sumitomo Chemical Co., Ltd., 850 ppm by mass)

(2) A pellet containing linear low density polyethylene (MFR=0.9 g/10 min, density=914 kg/m$^3$) and an antioxidant (Sumilizer GP, manufactured by Sumitomo Chemical Co., Ltd., 850 ppm by mass)

(3) A masterbatch containing a white pigment ("SPEM-7A1155" manufactured by Sumika Color Co., Ltd.)

[Recycled Resin Pellet]

(Recycled Resin Pellet A)

A recycled resin pellet was prepared from a raw material film containing the following (1) to (4) at a mass ratio of 70/30/3/3.

(1) A pellet containing linear low density polyethylene (MFR=1.5 g/10 min, density=923 kg/m$^3$), an antioxidant (Sumilizer GP, manufactured by Sumitomo Chemical Co., Ltd., 850 ppm by mass), and a neutralizing agent (calcium stearate, 213 ppm)

(2) A pellet containing linear low density polyethylene (MFR=0.9 g/10 min, density=914 kg/m$^3$), an antioxidant (Sumilizer GP, manufactured by Sumitomo Chemical Co., Ltd., 850 ppm by mass), and a neutralizing agent (calcium stearate, 213 ppm)

(3) A masterbatch containing a white pigment ("SPEM-7A1155" manufactured by Sumika Color Co., Ltd.)

(4) A masterbatch containing an antistatic agent (base resin density=927 kg/m$^3$, antistatic agent component 10% by mass)

(Recycled Resin Pellet B)

A recycled resin pellet was prepared from a raw material film containing the following (1) to (4) at a mass ratio of 87/13/3/3.

(1) A pellet containing linear low density polyethylene (MFR=2.0 g/10 min, density=913 kg/m$^3$)

(2) A pellet containing linear low density polyethylene (MFR=0.9 g/10 min, density=914 kg/m$^3$), an antioxidant (Sumilizer GP, manufactured by Sumitomo Chemical Co., Ltd., 850 ppm by mass), and a neutralizing agent (calcium stearate, 213 ppm)

(3) A masterbatch containing a white pigment ("SPEM-7A1155" manufactured by Sumika Color Co., Ltd.)

(4) A masterbatch containing an antistatic agent (base resin density=927 kg/m$^3$, antistatic agent component 10% by mass)

(Recycled Resin Pellet C)

A recycled resin pellet was prepared from a raw material film containing the following (1) to (5) at a mass ratio of 70/30/6.5/3/3.

(1) A pellet containing linear low density polyethylene (MFR=1.5 g/10 min, density=923 kg/m$^3$), an antioxidant (Sumilizer GP, manufactured by Sumitomo Chemical Co., Ltd., 850 ppm by mass), and a neutralizing agent (calcium stearate, 213 ppm)

(2) A pellet containing linear low density polyethylene (MFR=0.9 g/10 min, density=914 kg/m$^3$), an antioxidant (Sumilizer GP, manufactured by Sumitomo Chemical Co., Ltd., 850 ppm by mass), and a neutralizing agent (calcium stearate, 213 ppm)

(3) An antioxidant masterbatch containing 22000 ppm by mass of an antioxidant (Sumilizer GP, manufactured by Sumitomo Chemical Co., Ltd.)

(4) A masterbatch containing a white pigment ("SPEM-7A1155" manufactured by Sumika Color Co., Ltd.)

(5) A masterbatch containing an antistatic agent (base resin density=927 kg/m$^3$, antistatic agent component 10% by mass)

(Recycled Resin Pellet D)

A recycled resin pellet was prepared by changing (1) to (5) in the recycled resin pellet-C to a mass ratio of 87/13/8/3/3.

(Recycled Resin Pellet E)

A recycled resin pellet was prepared from a raw material film containing the following (1) to (5) at a mass ratio of 70/30/8/3/3.

(1) A pellet containing linear low density polyethylene (MFR=1.5 g/10 min, density=923 kg/m$^3$), an antioxidant (Sumilizer GP, manufactured by Sumitomo Chemical Co., Ltd., 850 ppm by mass), and a neutralizing agent (calcium stearate, 213 ppm)

(2) A pellet containing linear low density polyethylene (MFR=0.9 g/10 min, density=914 kg/m$^3$), an antioxidant (Sumilizer GP, manufactured by Sumitomo Chemical Co., Ltd., 850 ppm by mass), and a neutralizing agent (calcium stearate, 213 ppm)

(3) An antioxidant masterbatch containing 22000 ppm by mass of an antioxidant (Sumilizer GP, manufactured by Sumitomo Chemical Co., Ltd.)

(4) A masterbatch containing a white pigment ("SPEM-7A1155" manufactured by Sumika Color Co., Ltd.)

(5) A masterbatch containing an antistatic agent (base resin density=927 kg/m$^3$, antistatic agent component 10% by mass)

(Recycled Resin Pellet F)

A recycled resin pellet was prepared from a raw material film containing the following (1) to (3) at a mass ratio of 70/30/3.

(1) A pellet containing linear low density polyethylene (MFR=1.5 g/10 min, density=923 kg/m$^3$), an antioxidant (Sumilizer GP, manufactured by Sumitomo Chemical Co., Ltd., 850 ppm by mass), and a neutralizing agent (calcium stearate, 213 ppm)

(2) A pellet containing linear low density polyethylene (MFR=0.9 g/10 min, density=914 kg/m$^3$), an antioxidant (Sumilizer GP, manufactured by Sumitomo Chemical Co., Ltd., 850 ppm by mass), and a neutralizing agent (calcium stearate, 213 ppm)

(3) A masterbatch containing a white pigment ("SPEM-7A1155" manufactured by Sumika Color Co., Ltd.)

(Recycled Resin Pellet G)

A recycled resin pellet was prepared from a raw material film containing the following (1) to (4) at a mass ratio of 70/30/3/12.

(1) A pellet containing linear low density polyethylene (MFR=1.5 g/10 min, density=923 kg/m$^3$), an antioxidant (Sumilizer GP, manufactured by Sumitomo Chemical Co., Ltd., 850 ppm by mass), and a neutralizing agent (calcium stearate, 213 ppm)

(2) A pellet containing linear low density polyethylene (MFR=0.9 g/10 min, density=914 kg/m$^3$), an antioxidant (Sumilizer GP, manufactured by Sumitomo Chemical Co., Ltd., 850 ppm by mass), and a neutralizing agent (calcium stearate, 213 ppm)

(3) A masterbatch containing a white pigment ("SPEM-7A1155" manufactured by Sumika Color Co., Ltd.)

(4) A masterbatch containing an antistatic agent (base resin density=927 kg/m³, antistatic agent component 10% by mass)

[Measurement Method]

Measured values of items in Examples and Comparative Examples were measured by the following methods.

<Color Tone Evaluation>

Using a color computer SM-P45 manufactured by Suga Test Instruments Co., Ltd., an x value (red color mixing ratio), a y value (green color mixing ratio), and a z value (blue color mixing ratio) of a surface layer 1 of a three-layer film prepared in Examples or Comparative Examples were determined on the basis of the stimulus value direct reading method defined in JIS Z8722. As a geometric condition of illumination and light reception, the condition a described in "Method for measuring reflective object" was used. The measurement was performed three times for each sample, and a standard deviation of each of the x value, the y value, and the z value was determined. The smaller the standard deviation is, the less a variation in color of the surface layer 1 of the three-layer film is, which is preferable.

<Evaluation of Yellowness (YI)>

Using a color computer SM-P45 manufactured by Suga Test Instruments Co., Ltd., yellowness (YI) of the surface layer 1 of the three-layer film prepared in Examples and Comparative Examples was determined according to the reflection method described in JIS K 7103-1977. The measurement was performed three times for each sample, and an average value thereof was determined. The smaller the yellowness (YI) value, the less yellowing of the film is, which is preferable.

<Scratch Resistance Test>

Using a friction coefficient measuring machine AB-401 manufactured by TESTER SANGYO CO., LTD., the following observation film and a surface layer 2 of the three-layer film prepared in Examples or Comparative Examples were rubbed with each other to prepare a sample for a scratch resistance test.

The observation film was slid on the surface layer 2 of the three-layer film according to the procedure of JIS K7125-1987 except that a sliding plate to which the observation film was fixed was moved under a condition of a thread having a weight of 700 g and a sliding speed of 200 m/min. A surface of the observation film was observed with an optical microscope (AxisPro SS manufactured by Micro Support Co., Ltd.) at a magnification of 1948.3 in a reflection mode. As for an observation region, observation was performed at a total of 16 positions formed by arbitrary four positions in the vertical direction and arbitrary four positions in the horizontal direction from a scratched region. In one observation region, observation region was performed in five visual fields×five visual fields, and images of a total of 25 visual fields were synthesized to form one image. The number of scratches appearing in the obtained image was measured, the number of scratches per unit area was determined using a visual field size of the image, and an average in the entire observation region was determined.

(Observation Film Used for Scratch Resistance Test)

A film containing an ethylene-1-hexene copolymer ("Excellen GMH CB0004" manufactured by Sumitomo Chemical Co., Ltd., MFR=0.4 g/10 min, density=926 kg/m³) and having a thickness of 100 μm.

Example 1

A laminated film in which a surface layer 1, an inner layer, and a surface layer 2 were laminated in this order was prepared by a coextrusion inflation molding method. The above-described unused resin pellet was used as each of a resin pellet for the surface layer 1 and a resin pellet for the surface layer 2. The above-described recycled resin pellet was used as a resin pellet for the inner layer.

In coextrusion inflation molding, by performing processing at a die temperature of 200° C., a total extrusion amount of 30 kg/h, a blow ratio of 2.0, and a take-up speed of 4.4 m/min using a three-layer inflation film processing machine manufactured by placo co., ltd., a laminated film having a thickness of surface layer 1/inner layer/surface layer 2 of 40 μm/40 μm/40 μm was prepared. The obtained laminated film was subjected to color tone evaluation and a scratch resistance test. Results thereof are illustrated in Table 1.

Comparative Example 1

A multilayer film was prepared in a similar manner to Example 1 except that the above-described unused resin pellet was used as each of the resin pellet for the surface layer 1 and the resin pellet for the inner layer, and the above-described recycled resin pellet A was used as the resin pellet for the surface layer 2. The obtained multilayer film was subjected to color tone evaluation and a scratch resistance test. Results thereof are illustrated in Table 1.

Comparative Example 2

A multilayer film was prepared in a similar manner to Example 1 except that the above-described recycled resin pellet A was used as the resin pellet for the surface layer 1, and the above-described unused resin pellet was used as each of the resin pellet for the inner layer and the resin pellet for the surface layer 2. The obtained multilayer film was subjected to color tone evaluation and a scratch resistance test. Results thereof are illustrated in Table 1.

Comparative Example 3

A multilayer film was prepared in a similar manner to Example 1 except that the above-described recycled resin pellet A was used as each of the resin pellet for the surface layer 1, the resin pellet for the inner layer, and the resin pellet for the surface layer 2. The obtained multilayer film was subjected to color tone evaluation and a scratch resistance test. Results thereof are illustrated in Table 1.

Reference Example 1

A multilayer film was prepared in a similar manner to Example 1 except that the above-described unused resin pellet was used as each of the resin pellet for the surface layer 1, the resin pellet for the inner layer, and the resin pellet for the surface layer 2. The obtained multilayer film was subjected to color tone evaluation and a scratch resistance test. Results thereof are illustrated in Table 1.

Example 2

A multilayer film was prepared in a similar manner to Example 1 except that the above-described unused resin pellet was used as each of the resin pellet for the surface layer 1 and the resin pellet for the surface layer 2, and the above-described recycled resin pellet B was used as the resin pellet for the inner layer. The obtained multilayer film was subjected to color tone evaluation and a scratch resistance test. Results thereof are presented in Table 2.

Example 3

A multilayer film was prepared in a similar manner to Example 1 except that the above-described unused resin pellet was used as each of the resin pellet for the surface layer 1 and the resin pellet for the surface layer 2, and the above-described recycled resin pellet F was used as the resin pellet for the inner layer. The obtained multilayer film was subjected to color tone evaluation and a scratch resistance test. Results thereof are presented in Table 2.

Example 4

A multilayer film was prepared in a similar manner to Example 1 except that the above-described unused resin pellet was used as each of the resin pellet for the surface layer 1 and the resin pellet for the surface layer 2, and the above-described recycled resin pellet G was used as the resin pellet for the inner layer. The obtained multilayer film was subjected to color tone evaluation and a scratch resistance test. Results thereof are presented in Table 2.

Comparative Example 4

A multilayer film was prepared in a similar manner to Example 1 except that the above-described unused resin pellet was used as each of the resin pellet for the surface layer 1 and the resin pellet for the surface layer 2, and the above-described recycled resin pellet C was used as the resin pellet for the inner layer. The obtained multilayer film was subjected to color tone evaluation and a scratch resistance test. Results thereof are presented in Table 2.

Comparative Example 5

A multilayer film was prepared in a similar manner to Example 1 except that the above-described unused resin pellet was used as each of the resin pellet for the surface layer 1 and the resin pellet for the surface layer 2, and the above-described recycled resin pellet D was used as the resin pellet for the inner layer. The obtained multilayer film was subjected to color tone evaluation and a scratch resistance test. Results thereof are presented in Table 2.

Comparative Example 6

A multilayer film was prepared in a similar manner to Example 1 except that the above-described unused resin pellet was used as each of the resin pellet for the surface layer 1 and the resin pellet for the surface layer 2, and the above-described recycled resin pellet E was used as the resin pellet for the inner layer. The obtained multilayer film was subjected to color tone evaluation and a scratch resistance test. Results thereof are presented in Table 2.

TABLE 1

| | Example 1 | Comparative Example 1 | Comparative Example 2 | Comparative Example 3 | Reference Example 1 |
|---|---|---|---|---|---|
| Layer configuration (surface layer 1/inner layer/surface layer 2) | unused resin/ recycled resin A/ unused resin | unused resin/ unused resin/ recycled resin A | recycled resin A/ unused resin/ unused resin | recycled resin A/ recycled resin A/ recycled resin A | unused resin/ unused resin/ unused resin |
| Antioxidant in recycled resin composition (ppm by mass) | 802 | 802 | 802 | 802 | — |
| Antistatic agent in recycled resin composition (ppm by mass) | 2830 | 2830 | 2830 | 2830 | — |
| Number of scratches (number/mm$^2$) | 10.6 | 13.8 | 9.5 | 16.5 | 11.5 |
| x (red color mixing ratio) standard deviation | 3.02E−03 | 2.49−03 | 5.37E−03 | 2.86E−02 | 4.36E−04 |
| y (green color mixing ratio) standard deviation | 4.04E−03 | 1.27E−03 | 1.39E−02 | 2.19E−02 | 5.76E−03 |
| z (blue color mixing ratio) standard deviation | 6.75E−03 | 3.75E−03 | 1.92E−02 | 4.83E−02 | 5.42E−03 |
| YI | −5.77 | −5.44 | −5.23 | −17.4 | 1.38 |

TABLE 2

| | Example 2 | Example 3 | Example 4 | Comparative Example 4 | Comparative Example 5 | Comparative Example 6 |
|---|---|---|---|---|---|---|
| Layer configuration (surface layer 1/ inner layer/surface layer 2) | unused resin/recycled resin B/unused resin | unused resin/recycled resin F/unused resin | unused resin/recycled resin G/unused resin | unused resin/recycled resin C/unused resin | unused resin/recycled resin D/unused resin | unused resin/recycled resin E/unused resin |
| Antioxidant in recycled resin composition (ppm by mass) | 104 | 825 | 739 | 2007 | 2265 | 0 |

TABLE 2-continued

|  | Example 2 | Example 3 | Example 4 | Comparative Example 4 | Comparative Example 5 | Comparative Example 6 |
|---|---|---|---|---|---|---|
| Antistatic agent in recycled resin composition (ppm by mass) | 2830 | 0 | 10435 | 2667 | 2632 | 2830 |
| Number of scratches (number/mm$^2$) | 9.3 | 4 | 3.7 | 7.8 | 4.5 | 2.8 |
| x (red color mixing ratio) standard deviation | 3.63E−03 | 3.13E−03 | 5.46E−03 | 3.53E−02 | 2.86E−02 | 9.93E−03 |
| y (green color mixing ratio) standard deviation | 1.23E−02 | 6.93E−03 | 3.53E−03 | 1.31E−02 | 2.86E−02 | 1.53E−02 |
| z (blue color mixing ratio) standard deviation | 1.55E−02 | 1.00E−02 | 4.21E−03 | 2.24E−02 | 1.89E−02 | 2.17E−02 |
| YI | −0.15 | 0.58 | 0.77 | −0.17 | 0.09 | 0.52 |

As can be seen from the results in Tables 1 and 2, the laminated film of each of Examples satisfying all the constituent requirements of the present invention has smaller standard deviations of the x value, the y value, and the z value than the laminated film of each of Comparative Examples, and thus it can be said that the laminated film of each of Examples has less color variation, that is, has a relatively excellent appearance. In addition, the laminated film of each of Examples satisfying all the constituent requirements of the present invention has a smaller number of scratches in the scratch resistance test than the laminated film of each of Comparative Examples, and thus it can be said that the laminated film of each of Examples has a relatively small damage property. In addition, the multilayer films of Examples 1 and 2 in which the content of the antistatic agent is 100 ppm by mass to 8000 ppm by mass have small yellowness (YI) values, and thus it can be said that the multilayer films of Examples 1 and 2 are also relatively excellent in hue.

INDUSTRIAL APPLICABILITY

The present invention can provide a laminated film which contains a recycled resin, has a relatively excellent appearance, and has a relatively small damage property, and a bag containing the laminated film.

The invention claimed is:

1. A laminated film comprising three or more resin layers including at least one inner layer and two surface layers, wherein the at least one inner layer contains a recycled resin composition containing a recycled resin and an antioxidant, and a content of the antioxidant is 100 ppm by mass to 2000 ppm by mass with respect to the recycled resin composition, wherein the recycled resin comprises a polymer containing a monomer unit derived from at least one selected from the group consisting of ethylene, propylene, and α-olefin having 4 to 12 carbon atoms;

wherein the antioxidant is a phosphorus-based antioxidant or a phenol-based antioxidant selected from 2,6-di-t-butyl-4-methylphenol (BHT), n-octadecyl-3-(3,5-di-t-butyl-4-hydroxyphenyl) propionate, pentaerythrityl-tetrakis [3-(3,5-di-t-butyl-4-hydroxyphenyl) propionate], 1,3,5-tris(3,5-di-tert-butyl-4-hydroxybenzyl) isocyanurate, 1,3,5-trimethyl-2,4,6-tris(3,5-di-t-butyl-4-hydroxybenzyl) benzene, and 3,9-bis[2-{3-(3-t-butyl-4-hydroxy-5-methylphenyl) propionyloxy}-1,1-dimethylethyl]-2,4,8,10-tetraoxaspiro [5•5] undecane and the two surface layers contain an unused resin;

and wherein the laminated film exhibits improved scratch resistance according to JIS K7125-1987 relative to an analogous laminated film comprising an unused resin composition as an inner layer.

2. The laminated film according to claim 1, wherein a content of the antioxidant is 500 ppm by mass to 1000 ppm by mass with respect to the recycled resin composition.

3. The laminated film according to claim 1, wherein the recycled resin composition further contains an antistatic agent.

4. The laminated film according to claim 3, wherein a content of the antistatic agent is 100 ppm by mass to 8000 ppm by mass with respect to the recycled resin composition.

5. The laminated film according to claim 4, wherein the content of the antistatic agent is 100 ppm by mass to 2000 ppm by mass with respect to the recycled resin composition.

6. The laminated film according to claim 1, wherein the recycled resin composition further contains a neutralizing agent.

7. The laminated film according to claim 6, wherein a content of the neutralizing agent is 100 ppm by mass to 2000 ppm by mass with respect to the recycled resin composition.

8. The laminated film according to claim 1, wherein a content of the resin containing the polymer is 99.5% by mass or more with respect to the recycled resin.

9. The laminated film according to claim 1, consisting of three resin layers.

10. The laminated film according to claim 1, having a thickness of 100 μm to 150 μm.

11. The laminated film according to claim 1, wherein a resin constituting the unused resin is a resin containing a polymer containing a monomer unit derived from at least one selected from the group consisting of ethylene, propylene, and an α-olefin having 4 to 12 carbon atoms.

12. The laminated film according to claim 1, wherein each of a resin constituting the recycled resin and a resin constituting the unused resin is a resin containing an ethylene homopolymer or an ethylene-based copolymer containing more than 50% by mass of a monomer unit derived from ethylene.

13. The laminated film according to claim 12, wherein the ethylene-based copolymer contains 90% by mass or more of a monomer unit derived from ethylene.

14. A bag comprising the laminated film according to claim 1.

\* \* \* \* \*